H. W. LAMPMAN.
LOCK FOR AUTOMOBILES.
APPLICATION FILED AUG. 12, 1921.
1,430,239.
Patented Sept. 26, 1922.
2 SHEETS—SHEET 1.
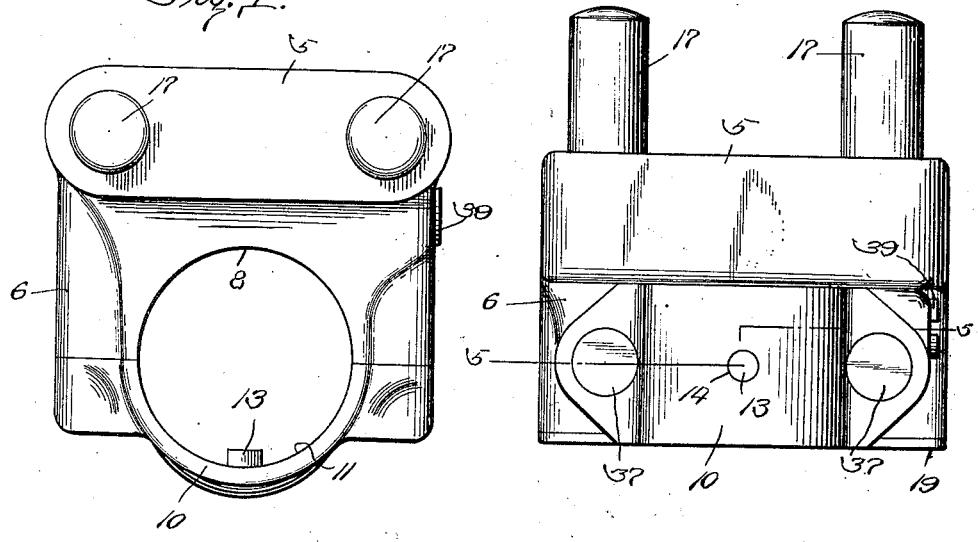
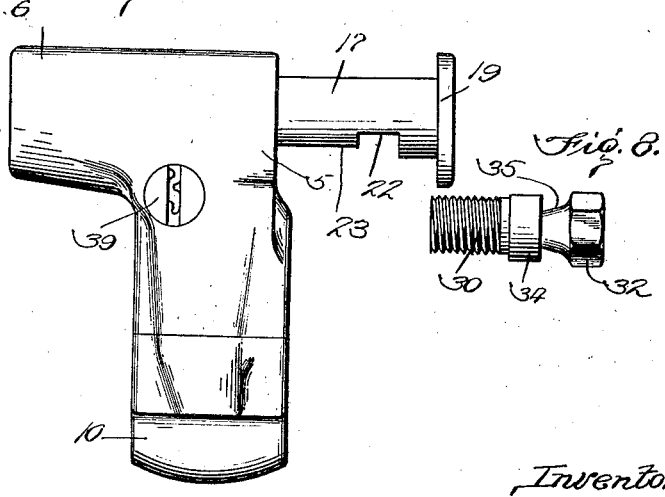
Inventor:
Herman W. Lampman
By Percy H. Moore
atty

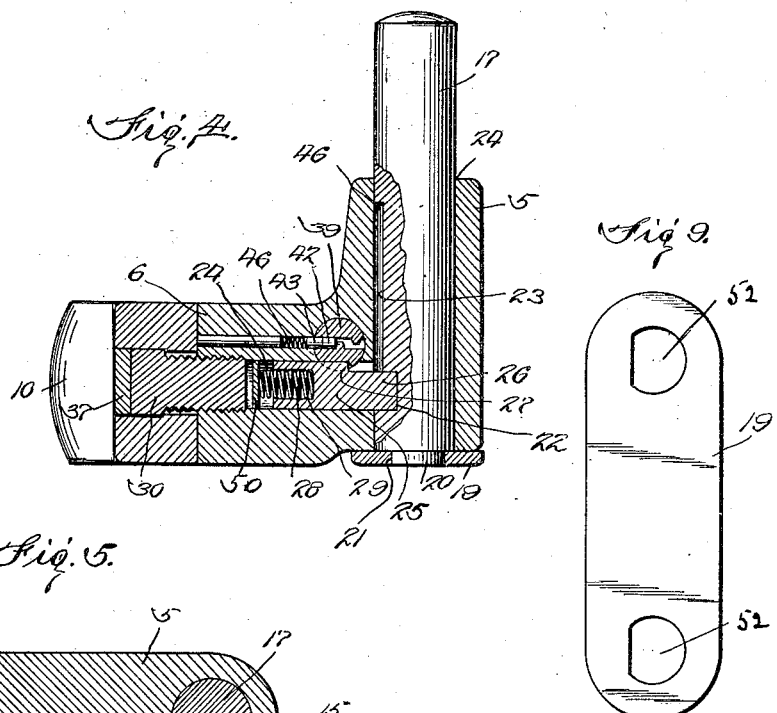
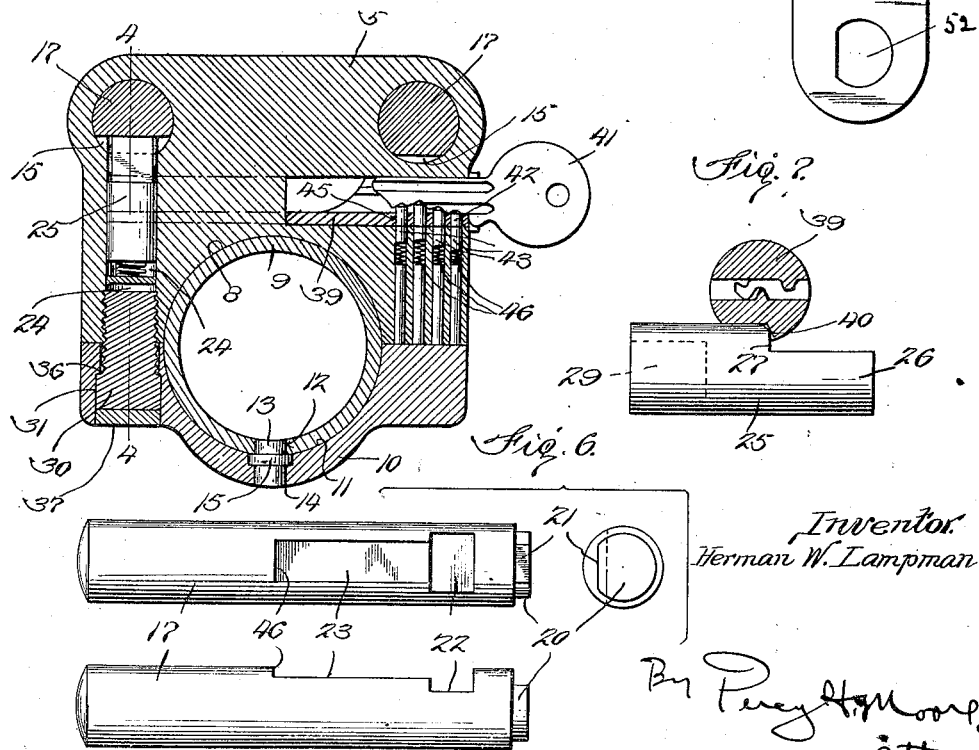

Patented Sept. 26, 1922.

1,430,239

UNITED STATES PATENT OFFICE.

HERMAN W. LAMPMAN, OF ANGOLA, INDIANA.

LOCK FOR AUTOMOBILES.

Application filed August 12, 1921. Serial No. 491,820.

*To all whom it may concern:*

Be it known that I, HERMAN W. LAMPMAN, a citizen of the United States of America, residing at Angola, in the county of Steuben and State of Indiana, have invented certain new and useful Improvements in Locks for Automobiles, of which the following is a specification.

My invention relates to locks for automobiles and has for its object to provide a simply constructed and easily installed device which when in operative position on the steering column of an automobile will prevent turning of the steering wheel sufficiently to enable a person to surreptitiously drive a car very far without getting into difficulty or otherwise attracting attention.

Other and further objects and advantages of my invention will be in part described and in part obvious as the specification is proceeded with.

In the accompanying drawings forming part of this specification:

Figure 1 is a plan view of my invention detached from the steering column showing the plungers in operative or extended position;

Figure 2 is a rear view of the invention with the bolts in Figure 1 position;

Figure 3 is an end view showing the plungers in inoperative or retracted position;

Figure 4 is a section on line 4—4 of Figure 5;

Figure 5 is a section on the line 5—5 of Figure 2;

Figure 6 is a detail of one of the plungers;

Figure 7 is a detail of one of the lock bolts and the tumbler for actuating the lock bolts;

Figure 8 is a detail of one of the screws for locking the clamping plate to the lock casing; and Figure 9 is a detail plan of the plate 19.

Referring more particularly to the drawings wherein like reference numerals refer to corresponding parts throughout the several views, 5 denotes a lock casing formed with an angularly disposed flange or enlargement 6 cut away intermediate its ends to provide the curved semi-circular seat 8 for the steering column 9.

The casing 5 is secured to the steering column by means of a clamp or yoke 10 having a centrally disposed curved portion 11 adapted together with the semi-circular seat 8, to embrace the steering column, the latter being provided with a small opening 12 in which seats the inner end of a pin 13, the outer end of which is seated in a corresponding small opening 14 in the clamp 10. A collar 15 on the pin 13 seats in the enlarged inner end of the opening 14 and is thus effectually held in place when the clamp is permanently affixed to the casing 5 in a manner presently to be described.

The casing is bored at each end as at 15 to slidably receive plungers 17 permanently connected at their lower or inner ends by means of a plate 19. As will be noted from figures 6 and 9 the plungers 17 are formed with reduced ends 20, having one flat face 21 adapted to enter and be permanently secured in correspondingly shaped openings 52 in the plate 19. The plungers when in extended position are adapted to receive therebetween a spoke of the steering wheel (not shown) and thereby prevent unauthorized use of the car. The plungers are preferably so spaced as to permit of some little play of the wheel but are not sufficiently spaced to enable a person to turn a corner or drive very far without attracting attention. The inner ends of the plungers 17 are formed with deep transverse recesses 22 and shallower communicating longitudinal recesses 23 for a purpose which will be presently understood.

The flange or enlargement 6 is formed with bores 24 adjacent its ends communicating with the bores 15. Slidably mounted in the bores 24 are a pair of lock bolts 25 having their ends 26 reduced or cut away to form shoulders 27. The reduced ends 26 of these lock bolts are normally projected into the transverse recesses 22 of the plungers 17 (when the plungers are in Figure 4 position) by means of coil springs 28 seated at one end in recesses 29 in the lock bolts, and at their other ends bearing against disk 50 pressed into the bores 24. Threaded bolts 30 passing through openings 31 at each end of the clamp 10 threadedly engage the bores 24 and secure the clamp to the lock casing, as best illustrated in Figures 4 and 5. The angular heads 32 of these bolts 30 are connected to the cylindrical collars 34 thereof by a reduced or weakened portion 35. The heads 32 are employed in screwing the threaded bolts home or until the collars 34 engage the shoulders 36 of the clamp, whereupon further turning of the bolts will cause the heads 32 to break off at their point of connection with the collars 34. Disks 37 are then pressed into the openings 31 flush with the outer face of the clamp, for an obvious purpose.

The lock bolts 25 are retracted from the transverse recesses 22 by means of tumbler 39 extending across the lock bolts and engaging the shoulders 27 thereof with corresponding shoulders 40. The tumbler 39 is operated or turned in the usual manner by means of a key 41 which engages the tumbler pins 42, which in turn forces the follower up tumbler pins 43 out of engagement with the openings 45 in the tumbler against the tension of springs 46, thus permitting the tumbler to be rotated.

When the lock bolts 25 have been withdrawn from the recesses 22 the plungers 17 can be moved to Figure 3 or inoperative position, it being understood that during this operation the ends 26 of the bolts will enter the longitudinal recesses 23. Complete withdrawal of the plungers 17 from the bores will be prevented by contact of the reduced ends of the lock bolts with the end wall or shoulder 46 of the recesses 23.

To move the plungers from the Figure 3 or inoperative position to a locking or operative position, all that is necessary for the user to do, is to push upwardly on the plate 19 until the plate comes in contact with the lock casing, whereupon the lock bolts will automatically enter the transverse recesses 22.

Having thus described my invention, what I claim is:

1. In an automobile lock, a lock casing having an angularly disposed enlarged portion curved to receive the steering column of the automobile, a clamp for securing said enlarged portion to said steering column, spaced plungers slidable in said casing and adapted to receive a spoke of the steering wheel therebetween when in operative position, a plate connecting said plungers, said plungers being formed with transverse slots, spring pressed lock bolts slidable in said enlargement adapted to seat in said slots to lock said plungers in operative position, and means for withdrawing said lock bolts from said slots.

2. In an automobile lock, a lock casing, means for securing said casing to the steering column of an automobile, spaced bores in said casing, a pair of plungers slidably mounted in said bores, means connecting said plungers together to limit the movement of said plungers to extended position, a locking bolt for limiting movement of said plungers to retracted position, said plungers when in extended position adapted to receive therebetween a spoke of the steering wheel.

3. A device for locking the steering wheel of an automobile comprising a casing having spaced bores therein, means for locking said casing to the steering column of the automobile, plungers slidable in said bores, a plate secured at its opposite ends to the lower end of said plungers, said plungers adapted to straddle a spoke of the steering wheel with their upper ends when said plungers are in extended position, lock bolts for locking said plungers in extended position, and a key actuated tumbler for unlocking said bolts.

In testimony whereof I affix my signature.

HERMAN W. LAMPMAN.